United States Patent Office

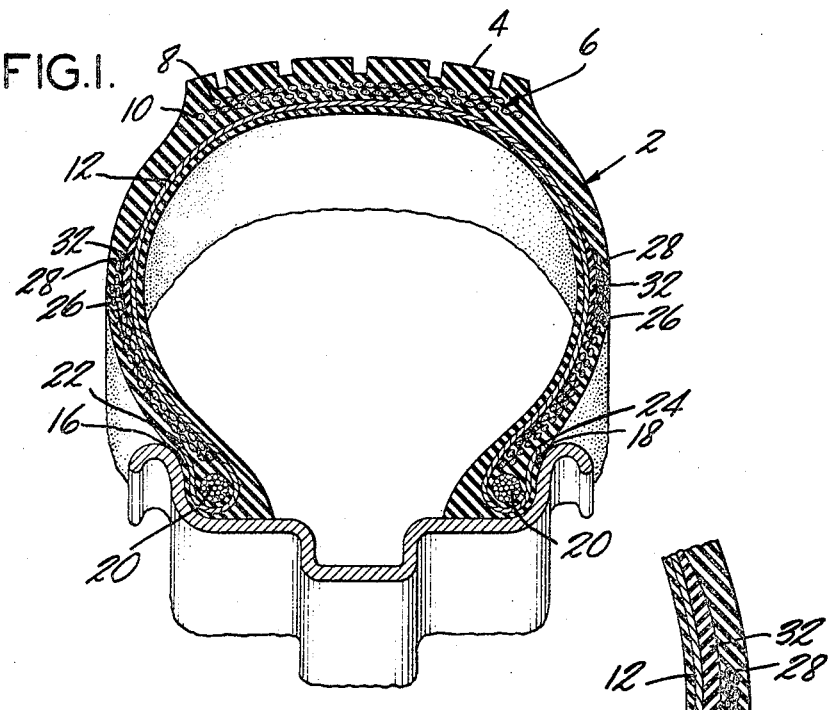
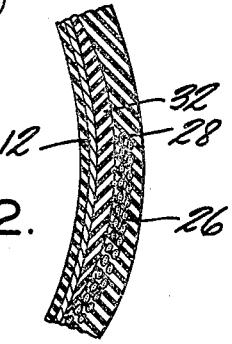
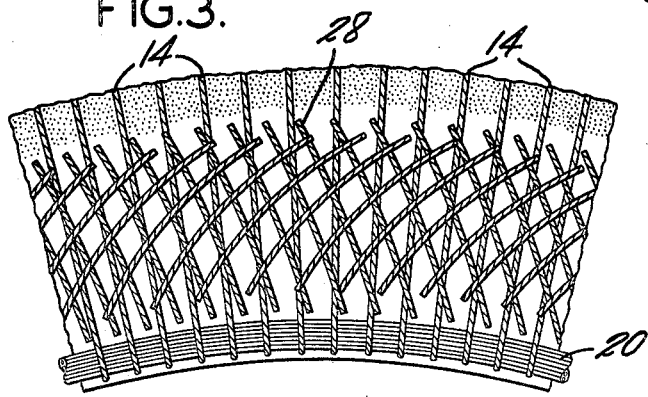

3,480,065
Patented Nov. 25, 1969

3,480,065
PNEUMATIC TIRES
Henri Verdier, Beauregard-l'Eveque, Puy-de-Dome, France, assignor to Compagnie Generale des Etablissements Michelin, raison sociale Michelin & Cie, Clermont-Ferrand, Puy-de-Dome, France
Filed June 21, 1967, Ser. No. 647,871
Claims priority, application France, June 21, 1966, 66,374
Int. Cl. B60c *13/00*
U.S. Cl. 152—353    2 Claims

ABSTRACT OF THE DISCLOSURE

The disclosure herein relates to radial carcass pneumatic tires containing plies of oblique elastic wires or cords in the sidewalls of the tire in the zone between mid-height of the tire and the bead wires, the oblique plies being separated from the radial wires or cords by an extra thickness of rubber to stabilize the tires during operation without materially decreasing the riding comfort of the tire; and a method for manufacturing such tires in which the oblique plies are separated by a removable sheet to enable the tire to be converted from a cylindrical shape, as assembled on a tire building drum, to a torus, without opposition from the crossed plies, the sheet being removed prior to vulcanizing of the tire.

---

This invention relates to improvements in pneumatic tires and particularly to tires having radial carcasses. Pneumatic tires include a carcass which usually extends from bead to bead and supports the sidewalls and tread of the tire. The carcass of a radial tire is composed of cords extending in radial planes and anchored to the bead wires.

It has been found that under certain circumstances, especially when rolling at very high speeds, vehicles equipped with radial carcass tires may exhibit a certain instability in their path and a tendency to veer off slightly to either side in accordance with the lateral strain to which the vehicle may be subjected. Such instability, which forces the driver to take continuous corrective action in order to keep his vehicle on the desired path, is essentially due to a transverse rigidity which is too low, a characteristic of this type of tire.

Various types of improvements for the radial carcass pneumatic tire have been proposed in order to remedy its instability at high speeds. In the main, these improvements have consisted in the reinforcement of various portions of the sidewalls of the tire, and, especially, in the reinforcement of all or part of the zone of the sidewall between mid-sidewall and the bead. The reinforcement consists of additional cords placed obliquely in relation to the radial cords.

While the stability of the tire may be improved in this manner, the improvement is, however, offset by other disadvantages. One disadvantage is that the reinforcement of the entire lower part of the sidewall by means of cords running in three directions reduces the riding comfort for the passengers of the vehicle. This is so because the shock waves due to irregularities in the road surface travel much more rapidly and without substantial dampening through the metallic or textile elements of the cords than they do through the elastomeric material of the sidewalls wherein the speed of the shock waves is greatly reduced and the waves are strongly dampened and dispersed. An increase in the number of wires or cords or plies thereof, therefore, greatly increases the magnitude of the shock transmitted to the vehicle through the sidewalls of the tire and the wheel. Another disadvantage lies in fact that the use of a variable number of plies of wires or cords in the zone of the sidewalls between the bead and mid-sidewalls causes abrupt changes of rigidity which facilitates the beginning of separation, i.e., cracks at the ends of the plies.

In accordance with the present invention, a typical tire includes a carcass of radially directed cords extending through the sidewalls and behind the tread of the tire and having its edges folded around the bead wires. Plies of oblique elastic cords are crossed and inserted in the zone of the sidewalls between mid-sidewall and the bead wires on the outside of the radial cords and between these cords and that portion of them which is folded back around the bead wires. The oblique cords form with the radial cords angles ranging from approximately 45 to 75 degrees, preferably increasing in the direction from the bead wires towards the middle of the sidewalls and increasing also as these cords are located at a greater distance from the radial cords.

The use of oblique elastic cords offers the double advantage over non-elastic cords of not reducing the vertical flexibility of the tire in any excessive manner and also of enabling deformation of the tire sidewalls without causing breakage or separation which might occur with the use of a reinforcement which is too rigid.

The insertion of the ends of the oblique elastic cords between the radial cords and that portion of them which is turned up around the bead wires is a procedure contrary to general practice. Normally, such a provision is carefully avoided inasmuch as it entails difficulty in the manufacture of the tire, particularly in manufacturing the tire in the shape of a cylinder and then shaping it into a torus. As a matter of fact, it was found that the oblique plies of cords or wires adhering to the radial plies of cords or wires formed an inextensible network of triangular meshes which made the shaping of the tire carcass impossible.

In accordance with the present invention, a procedure has been developed for insertion of the oblique elastic cords which is very effective for eliminating the separation of the cords and the elastomeric material of the tire sidewalls and also in eliminating the loosening of the cords at the ends of the oblique cord plies which are closest to the bead wires. In order to avoid the reaction of the cord plies running in the oblique direction with the ply or plies running in the radial direction, which, as noted above, makes the shaping of the tire carcass impossible, an elastic cloth is inserted between the ply or plies of radial cords and the ply or plies of oblique cords while the tire is manufactured on the drum. The cloth is then removed after the carcass has been molded into the shape of a torus and before vulcanizing.

As noted above, it is recognized that separation may easily occur if the oblique cords are placed directly upon the radial cords without anything between them but the calendering rubber of the two adjacent plies, i.e., a layer of rubber the thickness of which is of the same order as the diameter of the cords. These separations occur because the radial carcass cords are comparatively fixed in their position below mid-sidewall by the oblique cords while above mid-sidewall the cords are much more movable. The abrupt change in rigidity subjects the intermediate rubber in the zone of the mid-sidewall region of the tire to great shearing stresses. In accordance with the present invention, a layer of rubber having the best possible characteristics of adherence and resistance to shearing is inserted in the mid-sidewall region to separate the oblique cords and the radial cords. The thickness of this layer of rubber is greater than and, preferably, close to double the diameter of the cord.

For a better understanding of the present invention, reference may be had to the accompanying drawings in which:

FIGURE 1 is a view in cross-section through a radial plane of a tire cover;

FIG. 2 is an enlarged view in cross-section of a portion of a tire sidewall shown in FIGURE 1;

FIGURE 3 is an enlarged vertical sectional view of a portion of a tire sidewall shown in FIGURE 1.

As shown in FIGURE 1, a typical radial carcass penumatic tire 2 includes the tread 4, reinforced by a crown reinforcement 6 consisting of two crossed plies of cords 8 and 10, respectively. The carcass 12 of the tire includes at least one ply of radial cords 14 extending from one bead 16 to the bead 18 and having its edges folded around the bead wires 20 and ending a short distance from the bead wires at 22 and 24, respectively. The radial cords 14 may be elastic but need not be so and may be formed of any suitable filamentary material, such as steel, glass, polyester, polyamide, rayon, etc.

Two plies 26 and 28, respectively, of preferably crossed oblique elastic cords, the directions of which are not symmetrical in relation to the radial direction, are arranged on the outside of the radial cords 14. It is advantageous for the angle formed by the oblique cords and the radial cords to increase in the direction from the bead wires to mid-sidewalls to increase the stability of the tire. By preference, the angle formed by the oblique cords with the radial cords increases from 45 to 75 degrees. This increase of the angle is obtained by rotation (bending or displacement) of the oblique cords during shaping.

The cords 26 and 28 are elastic and may be composed, for example, of any of the following:

(a) Steel cords: three strands of four wires of 0.15 mm., provided with an elastic twist as disclosed in U.S. Patents Nos. 3,090,189 and 3,090,190;

(b) Polyamide cords: denier 840/3 or 1680/2;

(c) Polyester cords: denier 1000/3 or 1100/3;

(d) Rayon cords: denier 1650/2, 1650/3 or 2200/2.

By the term "elastic cords" it is intended to designate cords which have the ability to extend and/or compress. Cords of some elastic substance as nylon or cords of a material with little elasticity, such as steel, to which, however, elasticity is conferred by the manner of assembly or treatment of the elements, may be used. In accordance with the present invention, it is preferable that the oblique cords used have a modulus of elasticity of less than 5,000 DaN/mm.² and preferably less than 1,500 DaN/mm.².

Modulus of elasticity of a cord is expressed by the equation $$F/S = E \frac{dL}{L}$$

wherein E is the modulus, S is the net cross-section of the test cord, F is a force equal to 1/10 of the breaking load of the cord, L is the initial length of the test cord, and $dL$ is its elongation under the effect of force F.

The oblique elastic cords 26 and 28 are placed in the sidewalls of the tire outside of the radial cords 14. At the bead wire end, the ends of the oblique cords are inserted between the radial cords and that portion of the radial cords which is wrapped or folded around the bead wires 20. Preferably, the folded portion of the radial cords 14 does not extend much above the rim engaging beads 16 and 18.

Turning now to the method of manufacturing the tires in accordance with the present invention, plies of oblique cords are positioned to cross in directions which are not symmetrical in relation to the radial direction. As shown in FIGURE 3, in the course of building the tire, the oblique cords 26 and 28 have a tendency to slant, i.e., to form with the radial direction an angle which increases as the distance from the bead wires 20 increases.

In order to prevent the loosening of the plies in the mid-sidewall region where the oblique cord plies terminate, an extra layer of rubber 32 is inserted between the radial cords 14 of the carcass 12 and the oblique cords 26 and 28. This extra layer of rubber should extend over a width of 10 to 20 mm., between the radial cords 14 and the oblique cords 26 and 28 and about an equal distance over the radial cord plies beyond the edge of the oblique cord plies. It is possible, of course, to arrange for this extra thickness of rubber to extend over a wider zone, as, for example, in the form of a rubber layer extending from the middle of one sidewall to the middle of the other sidewall and passing behind the tread. Another alternative is to cover the entire carcass with the extra thick rubber layer.

To avoid during shaping of the tire the reaction of the cord plies running in the radial direction, an elastic cloth (not shown) is inserted between the ply or plies of radial cords and the plies of oblique cords while the tire is being built on the tire building drum. The cloth is removed after the carcass has been expanded in the shape of a torus.

It will be apparent to those skilled in the art that many modifications could be made to the tire as well as to the method of manufacture of the tire without departing from the spirit of the present invention. Therefore, the present invention is not deemed to be limited except as defined in the appended claims.

I claim:

1. A pneumatic tire casing comprising sidewalls, a tread portion joined to and between said sidewalls and bead wires located in the free edges of said sidewalls, at least one ply of radial reinforcing cords extending over the entire height of said sidewalls with the ends of said cords being folded around said bead wires, at least two plies of oblique, elastic and crossed reinforcing cords extending between about the middle of each sidewall of the tire and said bead wires, said oblique cords forming with said radial cords angles ranging from about 45° to 75° and having ends inserted between said radial cords and said ends of said radial cords folded around said bead wires, and a layer of rubber of substantial thickness located in and about the mid-portion of said sidewalls and interposed between said radial cords and the outer edges of said two plies of oblique cords.

2. The tire casing set forth in claim 1 in which said oblique cords are inclined relative to said radial cords at angles increasing in magnitude in a direction from said bead wires to said mid-portion of said sidewall and as said oblique cords are located at a greater distance from said radial cords.

References Cited

UNITED STATES PATENTS

| | | | |
|---|---|---|---|
| 2,958,360 | 11/1960 | Macklem et al. | 152—362 |
| 3,062,259 | 11/1962 | Boussu et al. | 152—356 |
| 3,253,636 | 5/1966 | Travers | 152—354 |

ARTHUR L. LA POINT, Primary Examiner

U.S. Cl. X.R.

152—354